Nov. 11, 1930.  C. H. ANDERSON  1,781,042
INTERNAL COMBUSTION ENGINE
Filed July 15, 1927  6 Sheets-Sheet 4

Inventor
C. H. Anderson
By Seymour & Bright
Attorneys

Nov. 11, 1930.                C. H. ANDERSON                 1,781,042
                        INTERNAL COMBUSTION ENGINE
                          Filed July 15, 1927         6 Sheets-Sheet 6

Inventor
C. H. Anderson
By Seymour Bright
Attorneys

Patented Nov. 11, 1930

1,781,042

UNITED STATES PATENT OFFICE

CHARLES H. ANDERSON, OF LEXINGTON, KENTUCKY

INTERNAL-COMBUSTION ENGINE

Application filed July 15, 1927. Serial No. 205,980.

My invention relates to internal combustion engines.

The object of the invention generally is an internal combustion engine having a high fuel economy throughout a wide range of loads, and includes an engine wherein separate charges of gaseous fuel and charge forming air are separately compressed in a power element or elements to the same pressure and the separately compressed charges are commingled while each is at the full pressure of compression and its corresponding temperature and mixed in the power element or elements wherein they have been separately compressed to form the power charge, thereby conserving the heat energy of compression and returning it to the power stroke. Where more than one power element or cylinder is employed it is convenient to compress the gaseous fuel and air charges in separate power elements or cylinders, and each charge is divided into measured parts to be mixed with similarly compressed and divided charges to form the power charge for the cylinders. My invention also contemplates an internal combustion engine wherein the compression pressure is maintained substantially constant throughout a wide range of loads and wherein the burning and expanding of the power charge takes place at a graduated or substantially constant pressure up to a certain point during the working stroke, this point being dependent upon the volume of the charge compression. To these ends I have devised a special arrangement of a power element or cylinder and automatically variable measuring and pressure retaining chambers for dividing and receiving the separately compressed gaseous fuel and air charges, together with connections for returning the divided separately compressed charges to the power element or cylinder during its working stroke.

As an illustration of one specific embodiment of my invention I show and describe herein a two or multi-cylinder engine constructed in accordance with the principles of my invention, but my invention is not limited to an engine having a plurality of cylinders or power elements nor to the precise details of the embodiment illustrated.

In the drawings, Figure 1 is a plan view of the motor head, the cover plate being removed;

Figure 6 is a vertical section on the line 6—6 of Fig. 1;

Figure 3:
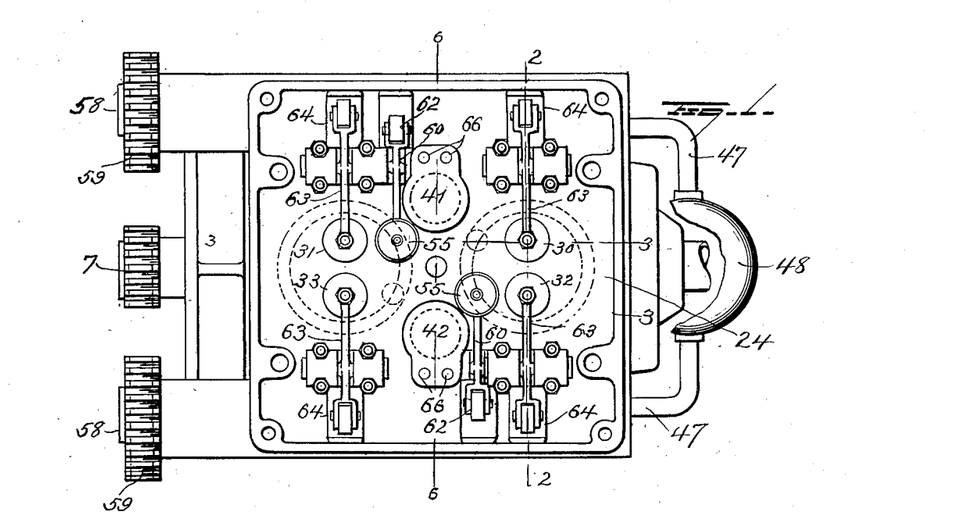
Figure 3 is a vertical section on the line 3—3 of Fig. 1, the plane of the upper part of the section being also indicated by the line 3—3 of Fig. 1.
Figure 4:
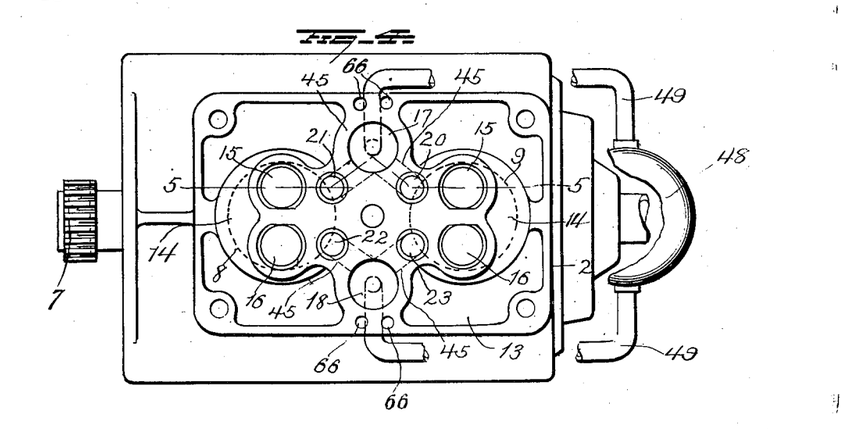
Figure 4 is a horizontal section on the line 4—4 of Fig. 2.
Figure 5:
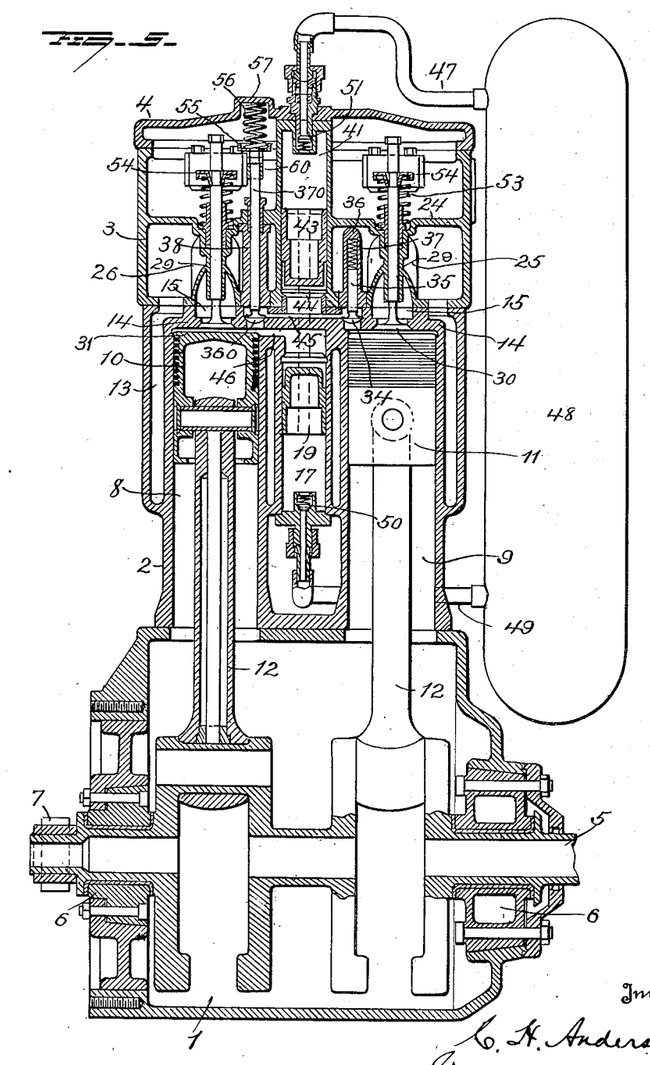
Figure 5 is a vertical section on the line 5—5 of Fig. 4.
Figure 7:
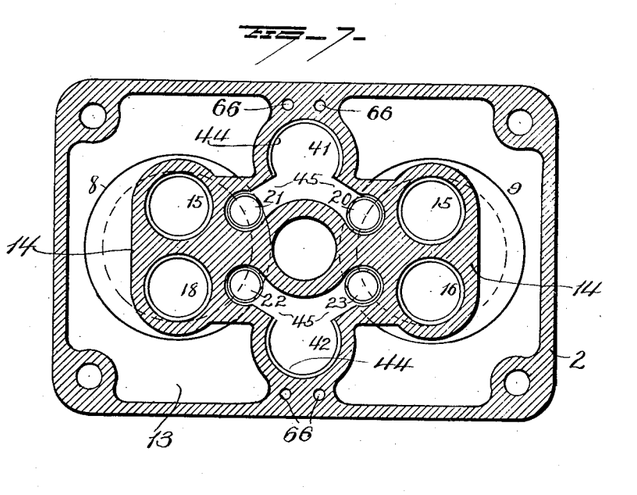
Figures 7 and 8 are horizontal sections on the lines 7—7 and 8—8 of Fig. 6, respectively.
Figure 8:
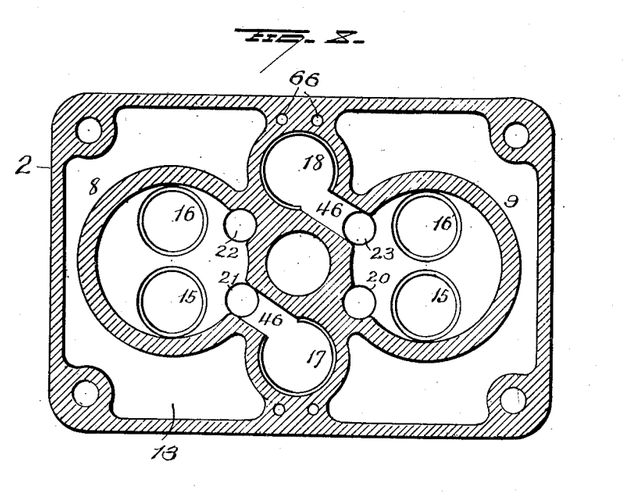

In setting up the engine, there is employed a crank case 1, a cylinder casting 2 secured upon the crank case, a valve gear casing 3 secured on the upper end of the cylinder casting, and a cover 4 secured upon and extending over the valve gear casing. A crank shaft 5 is journaled in suitable bearings 6 in the ends of the crank case and is equipped at one end with a sprocket pinion 7, the other end of the shaft being operatively connected in any convenient manner with the machinery to be driven. The cylinder casting contains an air cylinder 8 and a gas cylinder 9 arranged side by side and in which are pistons 10 and 11, respectively, connected by pitmen 12 with the crank shaft, the cranks being shown so arranged that the pistons operate in unison, as will be understood on reference to Figures 3 and 5. A water jacket 13 is formed on and around the upper portion of the cylinder casting, and the casting is so designed as to provide internal heads 14 for the cylinders in each of which there are formed inlet ports 15 and outlet or exhaust ports 16. The cylinder casting also contains two smaller auxiliary cylinders 17 and 18 which are located at opposite sides of the cylinders 8 and 9 on a vertical plane passing between them as shown in Figure 4, each of said auxiliary cylinders containing a floating piston valve 19. In the head of the cylinder casting between the several cylinders are ports 20, 21, 22 and 23.

Figure 2:
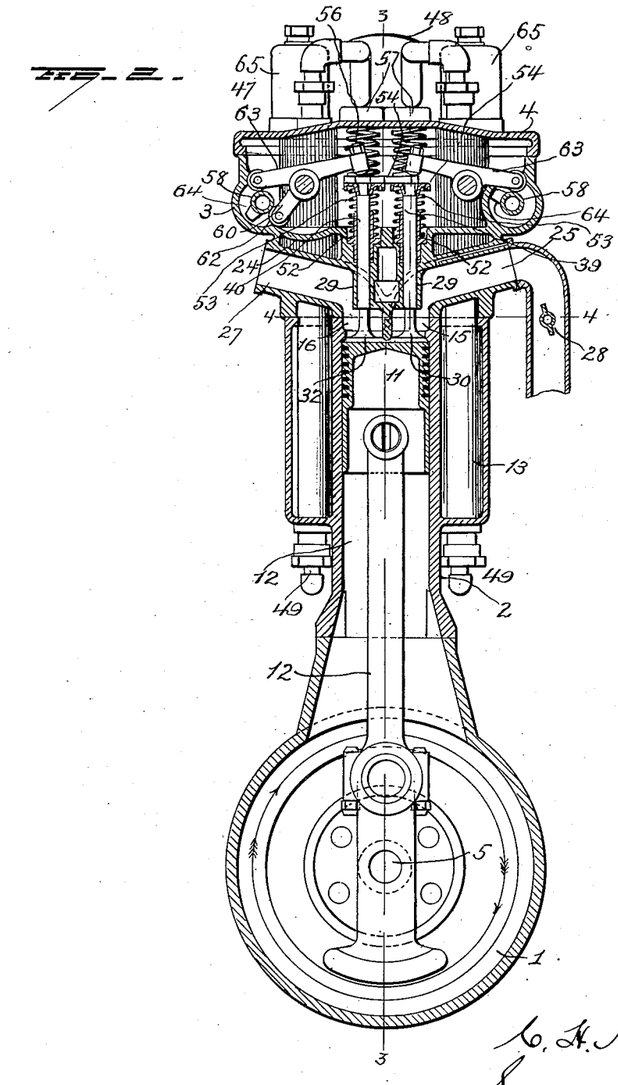
Figure 2 is a vertical section on the line 2—2 of Fig. 1.

The valve gear casing 3 has a partition 24 intermediate its height whereby it is formed into two chambers, the upper chamber containing the actuating elements of the valve mechanism and the lower chamber containing valve guides and also constituting an extension of the water jacket 13, as shown in Figure 2. The lower chamber also contains the integrally formed flues 25, 26, leading respectively to the inlet ports 15 of the cylinders 8 and 9, and the similar flues 27 leading from the outlet ports 16 of said cylinders, the inlet flues being equipped with throttle valves, as indicated at 28, and guides, as 29, being formed in the flues for the stems of the inlet valves 30, 31, and the outlet or exhaust valves 32, 33. Check valves, as 34, are arranged to seat in the ports 20 and 22 and have stems 35 playing in closed housings 36 in the lower chamber of the valve gear casing. A spring 37 in the upper end portion of the housing 36 bears upon the valve stem 35 and tends to hold the valve normally seated. Feed valves 360, similar in form to the valves 34, seat in the ports 21 and 23, but the stems 370 of the valves 360 rise through tubular guides 38 into the upper chamber of the valve gear casing, and the stems 39, 40 of the valves 30, 31, as well as the stems of the outlet or exhaust valves 32, 33, also pass into said upper chamber. Within the valve gear casing are auxiliary cylinders 41, 42 which may conveniently be alined axially with the cylinders 17 and 18, respectively, and in each cylinder 41, 42, is a floating piston valve 43 similar to the valve 19. The lower ends of the cylinders 41, 42 are open and register with recesses formed in the head of the cylinder casting and having valve-seat rings 44 secured therein, passages 45 being formed in the cylinder head to connect the cylinder 41 with the ports 20 and 21 and to connect the cylinder 42 with the ports 22 and 23 respectively, above the valve seats. while lower similar passages 46 connect the cylinder 17 with the cylinder 8 and connect the cylinder 18 with the cylinder 9 below the feed valve seats. The upper ends of the cylinders 41 and 42 communicate through pipes 47 with an air reservoir 48 and the lower ends of the cylinders 17, 18 communicate with said reservoir through pipes 49, check valves 50, 51 permitting flow from the reservoir but preventing flow in the opposite direction.

The check valves 34 are opened under pressure from the air and gas cylinders but the feed valves 360, the induction valves 30 and the exhaust valves 32 are mechanically operated by mechanism mounted in the upper chamber of the valve gear casing. Around the valve stems 39 and 40 of the induction and exhaust valves, seats 52 are formed in the partition 24 to receive the lower ends of expansion springs 53 which are coiled around the valve stems and bear, at their upper ends, against abutments 54 on the stems, thereby holding the valves up to their seats. The stems of the feed valves 360 are provided with annular enlargements or heads 55 at their upper ends against which bear springs 56 which are held in position by seats 57 formed in the cover 4. Mounted in suitable bearings in the ends of the casing 3 are cam shafts 58 each having a sprocket 59 on its projecting end about which and the sprocket 7 on the crank shaft a driving chain is trained. Engaging under the head 55 of each feed valve stem is one end of a rocker arm 60 which is suitably fulcrumed between its ends above the partition 24 and has its opposite end bearing upon a cam projection 61 on the adjacent cam shaft 58, a roller 62 being mounted in the last-mentioned end of the rocker arm to minimize frictional resistance and wear. Resting upon the upper end of the stem of each induction and exhaust valve is the inner end of a rocker arm 63 which is fulcrumed above the partition 24 and is actuated by a projection 64 on the adjacent cam shaft, the several projections 61 and 64 being so arranged that the rocker arms will be actuated to open the several valves in properly timed relation.

On the cover 4 are reservoirs 65 containing a supply of oil for lubricating the compression cylinder pistons, and 66 indicates oil-conveying passages leading from the reservoirs to the cylinders.

As has been stated, the pistons in the air cylinder 8 and the gas cylinder 9 work in unison. The piston in the air cylinder, however, makes its expansion stroke while the gas cylinder piston makes its intake stroke. The air and gas cylinders are both connected with all the auxiliary cylinders, directly through the passages 46 with the compression cylinders 17 and 18 respectively, and indirectly through the passages 45 and the ports 20, 21, 22 and 23 with the pressure-retaining cylinders 41, 42. When the piston valves in the several auxiliary cylinders are seated, they seal such cylinders and prevent air leaking into the air and gas cylinders 8 and 9, the pressure from the reservoir 48 holding the valves seated firmly. The chambers above the pistons in the cylinders 17 and 18 may be called compression chambers and the chambers below said pistons are cushion chambers, while the chambers below the pistons in the cylinders 41 and 42 may be called compression retaining chambers and the chambers above the latter pistons are cushion chambers. Assuming the desired maximum pressure of the motor to be 375 pounds, the air pressure in the reservoir 48 should be 350 pounds held constant by any convenient auxiliary means.

As shown most clearly in Fig. 6, the cylinders 17, 18, 41 and 42 are reduced in diameter for a short distance at their ported ends, conical seats 70 being located at the meeting of the two diameters. The floating pistons 19 and 43 are likewise formed, the smaller end of each piston forming a plug which enters the reduced diameter of its cylinder, trapping the air and reducing the impact of metal as the pistons engage the respective seats 70. When said pistons are seated, they seal the respective cylinders and prevent air leaking into the power cylinders and the pressure from the reservoir 48 holds them firmly in position.

At the beginning of the induction stroke in the gas cylinder 9, the expansion stroke is beginning in the air cylinder 8, the crank pin is at top center, the floating piston valve 19 in the directly connected compression cylinder 18 is seated and the floating piston 19 in cylinder 17 (which latter is directly connected with the air cylinder 8) is floating between equal pressures, the floating pistons of cylinders 41 and 42 are also floating between equal pressures, having been charged by previous compression strokes of the air and gas pistons. The induction, exhaust, feed and check valves of the gas cylinder are closed, and all similar valves of the air cylinder are closed with the exception of the feed valve which is just opening. As the crank descends, the induction valve of the gas cylinder opens and a charge of inflammable gas or vapor is drawn into the gas cylinder. In the air cylinder, the feed valve has opened and discharged the inflammable contents of cylinder 41 into the air cylinder, the pistons in cylinders 17 and 41 synchronously feeding the air and gas from their respective chambers in proportion for combustion and at a temperature to produce instant ignition and consumption of the charge. As the air piston nears the end of the stroke, the exhaust valve opens and the exhaust gases are expelled by the succeeding upward thrust of the air piston. As the gas piston moves upward on its compression stroke all of its connecting valves are closed, the piston valves in cylinders 18 and 41 being seated. As the pressure in the gas cylinder rises above the pressure in the reservoir 48, the piston valves in the cylinders 18 and 41 synchronously leave their seats and float in the direction of their cylinder heads between equal pressures. As the air is trapped in their cushion chambers at full reservoir pressure by the check valves 50 and 51, the pressure rises with and remains equal to that in the cylinder. When the piston reaches the end of its compression stroke, the check valve closes and the feed valve opens, connecting the cylinder with the air charge of compression retaining cylinder 42 and the piston is driven down by the expanding gases in a similar manner to that above described in connection with the air cylinder. When the pressure in the cylinder exceeds the pressure from the reservoir 48, the floating piston valves in the cylinders 18 and 41 are unseated and the compressed gas charge is divided between these cylinders, half the charge passing into the latter cylinder past the check valve 34. On the compression stroke in the air cylinder 8, the charge is divided between the cylinders 17 and 42, half of the charge entering the last-named cylinder through the port 22 and flowing past the cooperating check valve.

On the expansion stroke in the gas cylinder, the gas charge of cylinder 18 and the air charge of cylinder 42 flow into the gas cylinder from the cylinder 18 directly through its connecting port and from the cylinder 42 indirectly through the feed valve port 23, the gases meeting in the passage connecting the cylinders 18 and 9.

On the expansion stroke in the air cylinder, the air charge in the cylinder 17 and the gas charge in the cylinder 41 flow into the air cylinder, from cylinder 17 directly through the connecting passage and from the cylinder 41 indirectly through the feed valve port 21, the gases meeting in the passage or port connecting cylinders 17 and 8.

Partial loads are obtained by synchronously throttling the incoming charges of air and gas, thereby decreasing the volume stored in the compresser chambers and causing an earlier cut-off in the power cylinder and a longer expansion line; otherwise, the conditions and characteristics of the motor are constant. Near the end of the expansion stroke, the exhaust valve opens and the succeeding upstroke expels the gases of combustion. As all the connecting valves are closed and the space between the piston and the cylinder head is only what is necessary for mechanical clearance, the cylinder is very thoroughly scavenged.

The travel of the floating piston valves, when operating in multiple, will be synchronous and equal, regardless of difference in sectional area, inasmuch as when the piston valves are at rest the pressure at each end of each piston is equal and therefore, a difference in diameter will not affect the synchronous travel of the pistons. Any disturbance in the balance of pressure will be transmitted through the several passages and ports to all the pistons connected until the pressure on all the pistons is equal which will be when all the pistons are at the same distance from their respective seats. Constant pressure is not completely attained, the pressure in the cushion chambers of the several auxiliary cylinders varying with compression and expansion in the power cylinders. The excess pressure in the cushion chambers over the pressure in the reservoir depends on their area and the volume of the power cylinder charge. When the cylinder pressure (in the cylinder 8 or 9) rises above the reservoir pressure, the floating piston valves in the auxiliary cylinders then connected with the said cylinder 8 or 9 travel from their seats and float to a position of equal pressure. As the piston passes the dead center and descends on its expansion stroke, the pressure in the cylinder and connecting cushion chambers gradually and synchronously falls and at the line of cut-off, where the piston valves seat, the pressures in the power cylinder and the reservoir 48 are equal.

The air and gas cylinders have similar cycles. Part of the charge of each cylinder is alternately stored and fed to the other cylinder on the expansion stroke.

The proportion of air and hydrocarbon fuel may be regulated by varying the diameter of the gas compression chamber and of the compression retaining chamber and throttling the volume of the gas cylinder in ratio. For instance, if the area of the gas compression retaining pistons is one-half the area of the gas compression pistons, the gas power cylinder is throttled to receive one-half the volume of the air cylinder on the induction stroke. Then, on the expansion stroke of the air piston, the gas delivery through the feed valve will be one part and the air delivery two parts. The invention is adapted to high or low compression. With high compression the gases ignite by the heat of compression while with low compression an electric ignition system is employed. A two-cylinder unit is simpler mechanically than either a one or three-cylinder unit while a three-cylinder unit may use a richer mixture and will prove more efficient. It is obvious that the two cylinder unit illustrated may constitute one of two or more units operating on the same power shaft.

Having fully described my invention what I claim as new and desire to secure by Letters Patent, is:—

1. An internal combustion motor, comprising a plurality of combined compression and power units including cylinders and pistons, means whereby air and gas are compressed separately by said units, means for mixing compressed gas and air under compression and supplying the same to said units alternately, and causing expansion of the fluid mixture in said units.

2. An internal combustion motor comprising means to compress a volume of inflammable gas and a volume of air separately, means operable to cause mixing of the gases, meter their relative proportions and regulate their flow as they commingle while at the full temperature of compression, whereby the separately compressed and mixed air and gas will ignite and expand, alternately, in different compressor cylinders of the motor at a relatively constant pressure.

3. In an internal combustion engine, means for admitting a constituent of the power charge to the engine, compressing the same in a power element thereof and dividing the same into measured parts, and means for commingling in said power element a measured part of said compressed charge and a similarly compressed divided charge of another constituent to produce an inflammable gaseous mixture for the power charge.

4. In an internal combustion engine, means for admitting a constituent of the power charge to the engine, compressing the same in a power element thereof and dividing the same into measured parts, and means for commingling in said power element a measured part of said compressed charge and a similarly and previously compressed divided charge of another constituent to produce an inflammable gaseous mixture for the power charge.

5. In an internal combustion engine, the combination of a power cylinder and a pair of charge measuring and receiving chambers with means for admitting a charge to the cylinder for compression therein and connections between said cylinder and said measuring chambers permitting the supply of a part of each compressed charge to each of the measuring chambers.

6. In an internal combustion engine of the character set forth in claim 19 including means for expanding the power charge thus formed at a substantially constant pressure for a part of the stroke, while permitting the further expansion of the same according to the law of expanding gases.

7. An internal combustion engine including means for admitting charge forming air and gaseous fuel charges into the engine and separately compressing the same in the power means thereof, means for commingling the separately compressed charges to form the power charges during the expansion strokes of the engine, and means for varying the volume of gaseous fuel charges admitted and maintaining the compression thereof constant irrespective of the varying volumes.

8. In an internal combustion engine of the character set forth in claim 7 including means for separately throttling the supplies of charge forming air and gaseous fuel and maintaining the compression of the air charges constant irrespective of the varying volumes.

9. An internal combustion engine including a multiple number of power cylinders, means for admitting charge forming air and gaseous fuel charges into different ones of said power cylinders and separately compressing the same therein and means for commingling the separately compressed charges to form the fuel charges in the cylinders during their expansion strokes.

10. An internal combustion engine including a multiple number of power cylinders, means for admitting into said power cylinders and separately compressing different constituents of the fuel charge, and means for commingling the separately compressed charges to form the fuel charges in said cylinders during their working strokes.

11. An internal combustion engine including a multiple number of power cylinders, means for admitting into said power cylinders and separately compressing different constituents of the fuel charge therein and means for measuring and commingling the separately compressed charges to form the fuel charges in said cylinders during their expanding strokes and maintaining the proportions of the commingled charges constant while they commingle.

12. An internal combustion engine including at least two working cylinders, one of said cylinders being adapted to induct and compress one constituent of the fuel charge and the other cylinder being adapted to induct thereinto and compress another constituent of the fuel charge, measuring chambers connected with the compression space of one of the cylinders during its compression stroke, and means for supplying the charge in one of the measuring chambers to another cylinder during its expanding stroke.

13. An internal combustion engine including a multiple number of power cylinders, means for admitting charge forming air and gaseous fuel charges into different ones of said power cylinders and separately compressing the same, a pair of compression and pressure retaining chambers for each power cylinder and connected therewith during the compression stroke for dividing the compressed charge thereof into separate portions, and means for commingling a portion of the charge of one cylinder with a portion of the charge of another cylinder to form the fuel mixture during the expanding stroke of the latter.

14. An internal combustion engine of the character set forth in claim 13 including a valve interposed between the power cylinder and its compression retaining chambers to retain the pressure therein until the beginning of the expanding stroke of the power cylinder which is to receive the charge therein and a valve between the chamber and the latter power cylinder for supplying the charge thereto during the expanding stroke.

15. An internal combustion engine including at least two power cylinders, one of said cylinders being adapted to induct and compress the gaseous fuel charges and another cylinder being adapted to induct and compress charge forming air, each of said cylinders having associated therewith automatically variable compression and pressure retaining chambers which are in communication therewith during the compression stroke, and means for supplying the charge from the pressure retaining chamber of one cylinder to another cylinder during its working stroke and commingling the same with the charge of the latter.

16. In an internal combustion engine of the character set forth in claim 15 wherein the compression and pressure retaining chambers include cylinders with floating pistons therein opposed on one side by the pressures of the chambers and opposed on the other side by pressure from a fluid pressure source and check valves included in the pressure source connections.

17. In an internal combustion engine of the character set forth in claim 15 wherein a pressure retaining chamber is connected with its corresponding compression cylinder through a non-return check valve and is connected with another cylinder through a mechanically operated valve.

18. An internal combustion engine including means whereby variable charges of gaseous fuel and air are separately inducted into and compressed to a predetermined pressure in the engine power means, means whereby the separately compressed charges are commingled at the predetermined pressure and its corresponding compression temperature to form the power charges in a power means, and there burned and expanded at a constant pressure, including means whereby the proportions of the separately compressed charges are maintained constant as they are commingled, and permitting further expansion according to the law of expanding gases.

19. In an internal combustion engine means for admitting separate constituents of the power charge to the engine and separately compressing the same by the power means thereof and means for commingling in a power means said separately compressed charges to produce an inflammable gaseous mixture for the power charge.

20. An internal combustion engine including means whereby separate charges of gaseous fuel and air are injected into and separately adiabatically compressed to a predetermined pressure by the power means, and means whereby the separately compressed charges are commingled at the predetermined adiabatic compression pressure to form the power charges in a power means and there burned and expanded at a substantially constant pressure including means whereby the proportions of the separately compressed charges are maintained as they are commingled.

21. An internal combustion engine including means whereby variable charges of gaseous fuel and air are injected into and separately adiabatically compressed to a predetermined pressure by the engine power means and divided into measured charges, and means whereby the separately compressed and measured charges are commingled at the predetermined adiabatic compression pressure to form the power charges in a power means and there burned and expanded at a constant pressure.

22. In an internal combustion engine, a power cylinder, means for inducting fuel charges into said cylinder and compressing the same therein, at least two compression receiving cylinders in communication with said power cylinder and separate and independent synchronously moving floating pistons therein and air cushion chambers disposed back of the pistons.

23. An internal combustion engine of the constant compression type including a power cylinder, means for inducting fuel charges thereinto, a pair of compression receiving cylinders in communication with the compression space in the cylinder, and freely moving floating pistons in said chambers which are opposed on one side to the cylinder compression and on the other side to fluid pressure sources.

In testimony whereof, I have signed this specification.

CHARLES H. ANDERSON.